US008472933B1

(12) United States Patent
You

(10) Patent No.: US 8,472,933 B1
(45) Date of Patent: Jun. 25, 2013

(54) COMMUNICATION DEVICE AND CALL TRANSFER METHOD OF SAME

(75) Inventor: Qiang You, Shenzhen (CN)

(73) Assignees: Fu Tai Hua Industry (Shenzhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/477,071

(22) Filed: May 22, 2012

(30) Foreign Application Priority Data

Dec. 17, 2011 (CN) .......................... 2011 1 0424467

(51) Int. Cl.
*H04M 3/00* (2006.01)

(52) U.S. Cl.
USPC ...................... 455/417; 455/414.1; 455/412.1; 379/211.02; 379/212.01; 379/211.01; 379/207.09; 379/207.16

(58) Field of Classification Search
USPC ............... 379/211.02, 212.02, 11.01, 207.09, 379/207.16; 455/411, 417
See application file for complete search history.

(56) References Cited

U.S. PATENT DOCUMENTS

| 4,491,690 | A | * | 1/1985 | Daley ........................ 379/102.01 |
| 5,631,948 | A | * | 5/1997 | Bartholomew et al. ..... 379/88.18 |
| 6,026,152 | A | * | 2/2000 | Cannon et al. ............ 379/142.06 |
| 6,678,516 | B2 | * | 1/2004 | Nordman et al. ........... 455/414.1 |
| 7,499,697 | B2 | * | 3/2009 | Morimoto ................... 455/412.1 |
| 2006/0067501 | A1 | * | 3/2006 | Piatt .......................... 379/210.02 |
| 2007/0185737 | A1 | * | 8/2007 | Friedlander et al. .............. 705/3 |

* cited by examiner

*Primary Examiner* — Charles Shedrick
(74) *Attorney, Agent, or Firm* — Altis Law Group, Inc.

(57) ABSTRACT

A communication device includes a communication unit, a storage unit, a processor, and a transfer module. The communication unit communicates with an external communication device. The storage unit stores a call transfer code. The processor records a ring data of the external communication device. The ring data is defined to a ring count of each incoming call made from the external communication device and number of times called made from the external communication device. The transfer module compares the ring data with the call transfer code, sets the telephone number of the external communication device to be a transferring telephone number of the communication device when the ring data is equal to the call transfer code, and implements a call transfer function and message transfer function of the communication device.

19 Claims, 3 Drawing Sheets

COMMUNICATION DEVICE AND CALL TRANSFER METHOD OF SAME

BACKGROUND

1. Technical Field

The present disclosure relates to a communication device and a call transfer method of the communication device.

2. Description of Related Art

Most people have a communication device such as a mobile phone. Many people use a single telephone number for communication with others. However, a user may sometimes forget his/her mobile phone at home, which makes the user unable to answer an important incoming call to his/her mobile phone. Although call transfer technology can help the user to transfer an incoming call to his mobile phone to another target telephone, different circumstances prevent the defining of the telephone number of a target telephone as a transferee number being processed into his own mobile phone where, for example, the mobile phone has been forgotten somewhere and is not available.

Thus, a new communication device is desired to overcome the above-described shortcomings.

BRIEF DESCRIPTION OF THE DRAWINGS

The components in the drawings are not necessarily drawn to scale, the emphasis instead being placed upon clearly illustrating the principles of at least one embodiment. In the drawings, like reference numerals designate corresponding parts throughout the various views.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean at least one.

In general, the word "module", as used herein, refers to logic embodied in hardware or firmware, or to a collection of software instructions, written in a programming language, such as, Java, C, or assembly. One or more software instructions in the modules may be embedded in firmware, such as in an EPROM. The modules described herein may be implemented as either software and/or hardware modules and may be stored in any type of non-transitory computer-readable medium or other storage device. Some non-limiting examples of non-transitory computer-readable medium include CDs, DVDs, BLU-RAY, flash memory, and hard disk drives.

Figure 1:
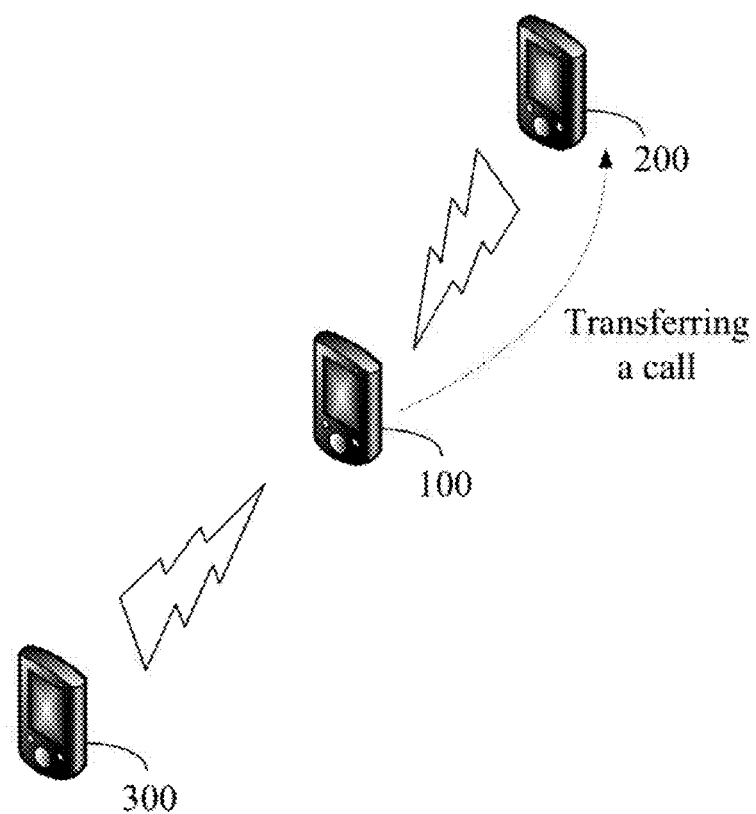
FIG. 1 is a schematic diagram illustrating one embodiment of a first communication device that transfers an incoming call from a third communication device to a second communication device.

FIG. 1 is a schematic diagram illustrating one embodiment of a first communication device 100 that can transfer an incoming call from a third communication device 300 to a second communication device 200. In one embodiment, "first communication device 100" is a single mobile phone that is in possession of a user, or intended to be in the possession of the user. In one embodiment, the user can perform a call transfer function of the first communication device 100 without operating the first communication device 100. That is, when the user knows that the third communication device 300 is planning to call the first communication device 100 which is not, or will not be, in the possession of the user, the user may arrange an automatic call transfer function in relation to the first communication device 100 by means of the second communication device 200. After that, an incoming call from the third communication device 300 or from any other communication device will be transferred to the second communication device 200, and the second communication device 200 can be utilized by the user to avoid missing any incoming call to the first communication device 100.

In an alternative embodiment, the second communication device 200 can be substituted by any other target communication device that is available for temporary use by the user. That is, any target communication device can perform the automatic call transfer function in relation to the first communication device 100.

Figure 2:
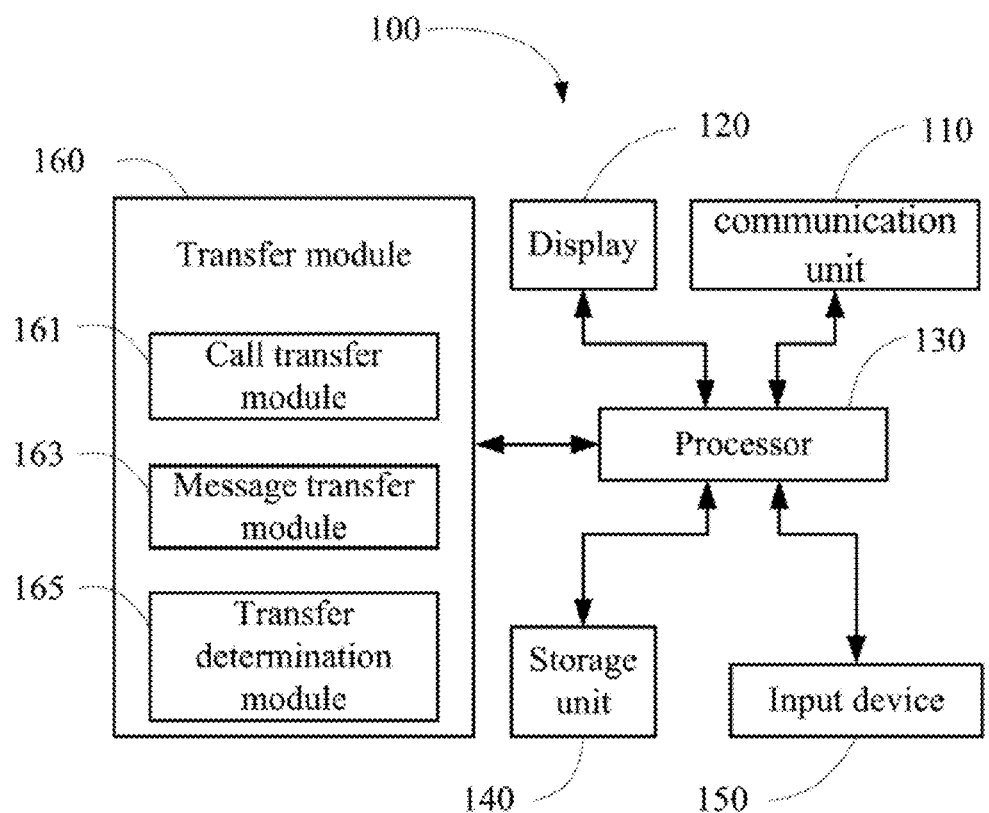
FIG. 2 is a schematic, block diagram of the first communication device in accordance with one embodiment.

FIG. 2 is a schematic, block diagram of the first communication device 100 in accordance with one embodiment. The first communication device 100 may be, for example, a mobile phone or a portable computer. FIG. 2 shows only one example of the first communication device 100, and the first communication device 100 can include more or fewer components than those shown in the embodiment, or have the various components in a different configuration.

In one embodiment, the first communication device 100 includes a communication unit 110, a display 120, a processor 130, a storage unit 140, an input device 150, and a transfer module 160.

The communication unit 110 is configured to communicate with other communication devices by transmitting messages or making or receiving voice calls. In one embodiment, the communication unit 110 may be a global system for mobile communication (GSM) device, a code division multiple access (CDMA) device, or a wide band CDMA (WCDMA) device.

The display 120 is configured to display messages, pictures, or telephone numbers of the first communication device 100. The display 120 may be a liquid crystal display (LCD) or an organic light emitting display (OLED).

The input device 150 is configured for a user to input words or instructions into the first communication device 100. In one embodiment, the input device 150 may be a keypad or a touch panel.

The processor 130 is configured to record a telephone number for all incoming calls of the first communication device 100, perform a ring count (how many rings) of each incoming call and record the number of times that one communication device has called (number of times called). The recorded number of times called and ring count of each incoming call from a single particular communication device are defined as ring data by the processor 130. In one embodiment, the processor 130 records the time at which each incoming call is made so as to be able to track number of times called from the same communication device within a predetermined time period. The ring data can be temporarily stored into the storage unit 140 by the processor 130.

The storage unit 140 is configured for storing telephone numbers, the telephone numbers of the telephones making incoming calls, and a call transfer code. The call transfer code is based upon an analysis of all the collected ring data. In one embodiment, the call transfer code is pre-defined to be predetermined number of times called and predetermined ring count of each incoming call within the predetermined time period. In one embodiment, the call transfer code is defined as ringing two times in a first incoming call, ringing one time in a second incoming call, and ringing five times in a third incoming call wherein the first, second and third incoming calls are from the same communication device within the predetermined time period, such as three minutes. In one embodiment, the storage unit 140 may be a random access memory (RAM) for temporary storage of information, and/or a read only memory (ROM) for permanent storage of information. In other embodiments, the storage unit 140 may also be an external storage device, such as a hard disk, a storage card, or a data storage medium.

In one embodiment, the transfer module 160 includes a call transfer module 161, a message transfer module 163, and a transfer determination module 165. The transfer determination module 165 is configured to receive the call transfer code from the storage unit 140 and the ring data from the processor 130, and compare all the ring data to the call transfer code.

When the collected ring data from the processor 130 is equal to the call transfer code, the transfer determination module 165 defines the telephone number of a particular communication device as the target telephone number, for example where the second communication device 200 has called the first communication device 100 to generate the ring data, and the target telephone number is set to be a transferring telephone number of the first communication device 100.

Then the transfer module 160 implements the call transfer function in relation to the first communication device 100 such that the call transfer module 161 transfers all incoming calls made to the first communication device 100 to a second communication device 200 which has the target telephone number. At the same time, the message transfer module 163 transfers incoming short message service (SMS) messages directed to the first communication device 100 to the second communication device 200.

In an alternative embodiment, any incoming messages are automatically encrypted by the processor 130 before being transferred to the second communication device 200. In one embodiment, a decryption key for reading the encrypted messages using the second communication device 200 can be set as a password of the first communication device 100.

Figure 3:
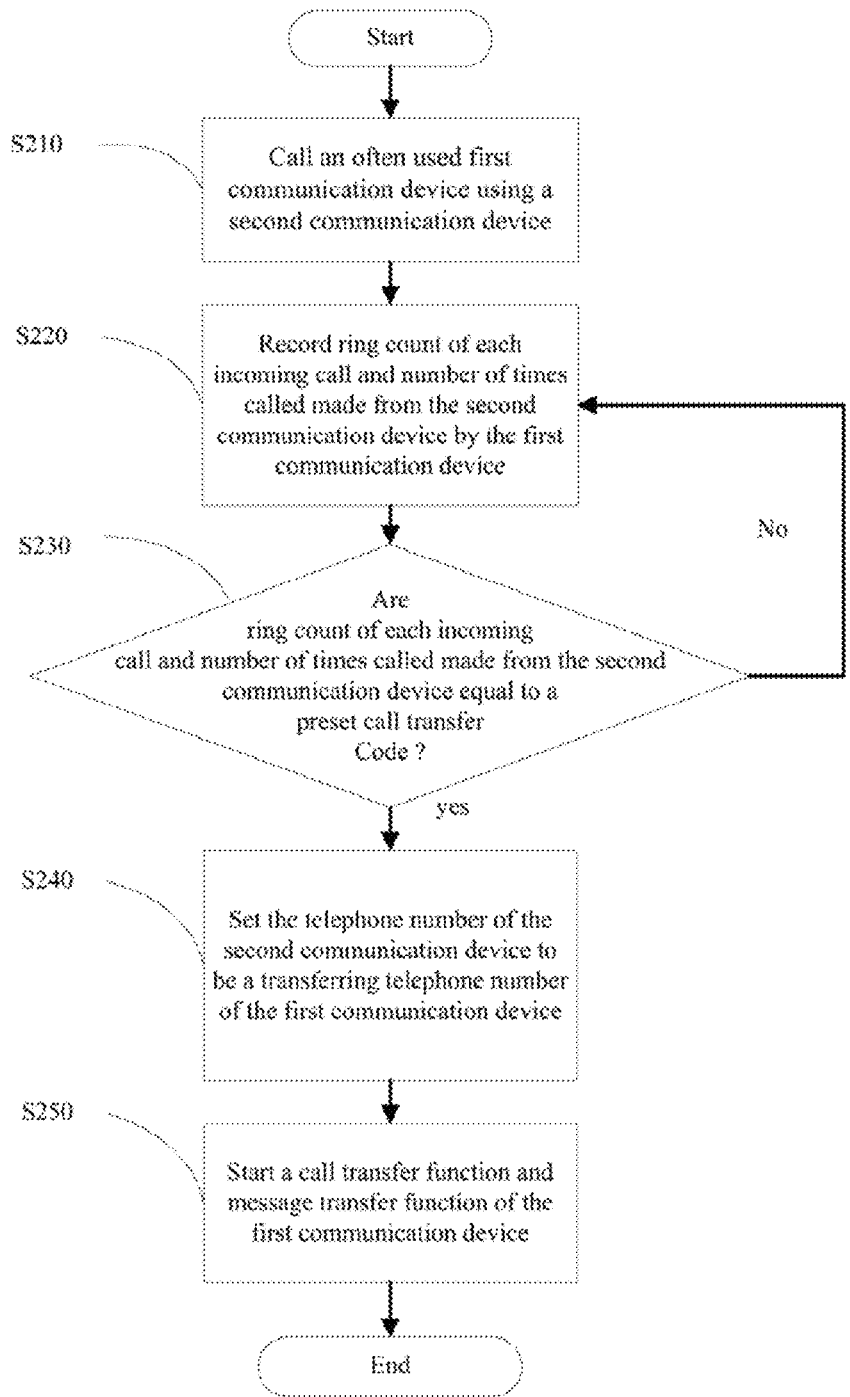
FIG. 3 is a flowchart of one embodiment of method of automatic call transferring that is implemented for transferring an incoming call to the first communication device to the second communication device.

FIG. 3 is a flowchart of one embodiment of method of automatic call transferring that is implemented for transferring an incoming call to the first communication device 100 to the second communication device 200. In this embodiment, the first communication device 100 is the basic communication device in the possession of, or intended to be in the possession of, the user. The second communication device 200 is a target communication device that is available for temporary use by the user to substitute for the first communication device 100 which has been forgotten somewhere.

In step S210, the user makes one or more calls to the first communication device 100 using the second communication device 200.

In step S220, the processor 130 of the first communication device 100 records all the incoming calls from the second communication device 200. The processor 130 further records the ring count of each incoming call and number of times called of the second communication device 200 and defines them as ring data. The ring data is provided to the transfer module 160 by the processor 130 as it is collected.

In step S230, the transfer module 160 determines if the ring data is equal to a call transfer code which is pre-stored in the storage unit 140. In this embodiment, the call transfer code is based upon an analysis of all the collected ring data. In one embodiment, the call transfer code is defined to be a predetermined number of times called and predetermined ring count of each incoming call within a predetermined time period.

In step S240, when the transfer determination module 165 determines that the collected ring data of the second communication device 200 is equal to the pre-stored call transfer code, the transfer determination module 165 sets the telephone number of a second communication device 200 as the target telephone number, and sets the target telephone number as the number to which all future telephone calls made to the first communication device 100 are to be transferred. The processor 130 of the first communication device 100 continues to collect and record all ring data in relation to any communication device.

In step S250, the transfer module 160 starts the call transfer function of the first communication device 100. The call transfer module 161 automatically transfers incoming calls made to the first communication device 100 to the second communication device 200. The message transfer module 163 automatically transfers incoming SMS messages directed to the first communication device 100 to the second communication device 200.

Since the user can set up a call transfer function in the first communication device 100 without having it in his possession, any target communication device can be used by the user to start the call transfer function of the first communication device 100 very quickly by calling the first communication device 100.

Even though numerous characteristics and advantages of certain inventive embodiments have been set out in the foregoing description, together with details of the structures and functions of the embodiments, the disclosure is illustrative only; and changes may be made in detail, especially in the matter of arrangement of parts within the principles of present invention to the full extent indicated by the broad general meaning of the terms in which the appended claims are expressed.

What is claimed is:

1. A communication device, comprising:
 a communication unit configured to communicate with an external communication device;
 a storage unit configured to store a call transfer code;
 a processor configured to record a ring data of the external communication device, the ring data be defined to a ring count of each incoming call made from the external communication device and number of times called made from the external communication device; and
 a transfer module configured to compare the ring data of the external communication device with the call transfer code, set the telephone number of the external communication device to be a transferring telephone number of the communication device when the ring data is equal to the call transfer code, and implement a call transfer function and message transfer function of the communication device.

2. The communication device of claim 1, wherein the call transfer code is predetermined number of times called and predetermined ring count of each incoming call from the external communication device to the communication device within a predetermined time period.

3. The communication device of claim 2, wherein the call transfer code is defined as ringing two times in a first incoming call from the external communication device, ringing one time in a second incoming call from the external communication device, and ringing five times in a third incoming call from the external communication device.

4. The communication device of claim 2, wherein the predetermined time period is three minutes.

5. The communication device of claim 2, wherein the processor records the time each incoming call is made by the external communication device and tracks number of times called from the external communication device within the predetermined time period.

6. The communication device of claim 1, wherein the transfer module comprises a transfer determination module configured to compare the ring data to the call transfer code.

7. The communication device of claim 6, wherein the transfer module comprises a call transfer module configured to transfer incoming calls made to the communication device to the external communication device.

8. The communication device of claim 6, wherein the transfer module comprises a message transfer module configured to transfer incoming messages made to the communication device to the external communication device.

9. The communication device of claim 8, wherein the incoming messages are encrypted by the processor before the incoming messages are transferred to the external communication device.

10. The communication device of claim 9, wherein a decryption key for reading the encrypted incoming messages using the external communication device is a password of the communication device.

11. A call transfer method of a communication device comprising:
    pre-storing a call transfer code in a storage unit of the communication device;
    receiving a call from an external communication device by the communication device;
    recording a ring count of each incoming call and number of times called of the external communication device by a processor of the communication device;
    comparing the ring count of each incoming call and the number of times called of the external communication device with the call transfer code by a transfer module of the communication device;
    setting the telephone number of the external communication device to be a transferring telephone number of the communication device when the ring count of each incoming call and the number of times called of the external communication device are equal to the call transfer code by the transfer module of the communication device; and
    starting call transfer function and message transfer function of the communication device by the transfer module of the communication device.

12. The call transfer method of claim 11, wherein the call transfer code is defined to be a predetermined number of times called and predetermined ring count of each incoming call from the external communication device within a predetermined time period.

13. The call transfer method of claim 12, wherein the call transfer code is defined as ringing two times in a first incoming call from the external communication device, ringing one time in a second incoming call from the external communication device, and ringing five times in a third incoming call from the external communication device.

14. The call transfer method of claim 12, wherein the predetermined time period is three minutes.

15. The call transfer method of claim 12, further comprising recording the time at which each incoming call is made so as to be able to calculate number of times called from the external communication device within the predetermined time period.

16. The call transfer method of claim 11, wherein the transfer module comprises a transfer determination module configured to receive the call transfer code from the storage unit and the ring data from the processor, and compare if the ring data is equal to the call transfer code.

17. The call transfer method of claim 16, further comprising transferring incoming messages made to the communication device to the external communication device by a message transfer module.

18. The call transfer method of claim 17, further comprising automatically encrypting the incoming messages by the processor before the incoming messages are transferred to the external communication device.

19. The call transfer method of claim 18, wherein a decryption key for reading the encrypted incoming messages using the external communication device is a password of the communication device.

* * * * *